United States Patent [19]

Norinsky

[11] 3,970,229

[45] July 20, 1976

[54] CONVERTIBLE SADDLE BRIEF CASE

[76] Inventor: Sidney Norinsky, 110 West 96th St., New York, N.Y. 10025

[22] Filed: Feb. 6, 1975

[21] Appl. No.: 547,656

Related U.S. Application Data

[63] Continuation-in-part of Ser. No. 547,655, Feb. 6, 1975.

[52] U.S. Cl................................ 224/31; 224/32 A; 224/35; 150/1.6
[51] Int. Cl.².............................................. B62J 9/00
[58] Field of Search .................. 224/31, 35, 43, 44, 224/32 A, 30 R; 150/1, 1.6

[56] References Cited

UNITED STATES PATENTS

| 424,324 | 3/1890 | Marshall | 224/44 |
| 1,485,067 | 2/1924 | Bristol | 224/35 UX |

FOREIGN PATENTS OR APPLICATIONS

| 267,224 | 3/1965 | Australia | 224/35 |
| 438,870 | 11/1925 | Germany | 224/35 |
| 580,343 | 9/1946 | United Kingdom | 224/43 |

Primary Examiner—Robert J. Spar
Assistant Examiner—Jerold M. Forsberg
Attorney, Agent, or Firm—Paul J. Sutton

[57] ABSTRACT

The present invention includes a convertible saddle briefcase capable of use, at the option of the user, as either a saddle-type support bag upon a wheeled vehicle having one or more support members, and a briefcase. A pair of housing receptacles are spaced from one another and joined by a web member which interconnects them at predetermined points thereof. Handles provide means for supporting both of said housing receptacles such that each may accommodate and hold articles of a selected size and shape. The web member is capable of supporting the housing receptacles in hanging positions on either side of a support member, while further being capable of folding to functionally and aesthetically providing the user with an article having the appearance of a briefcase.

1 Claim, 8 Drawing Figures

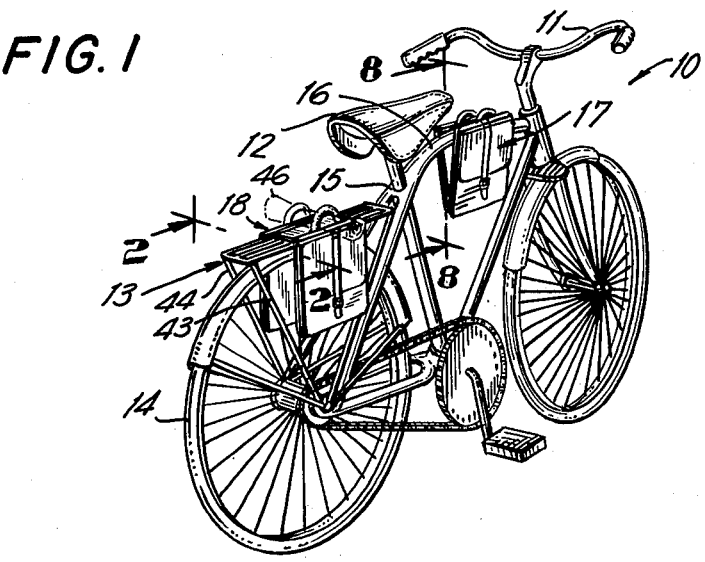

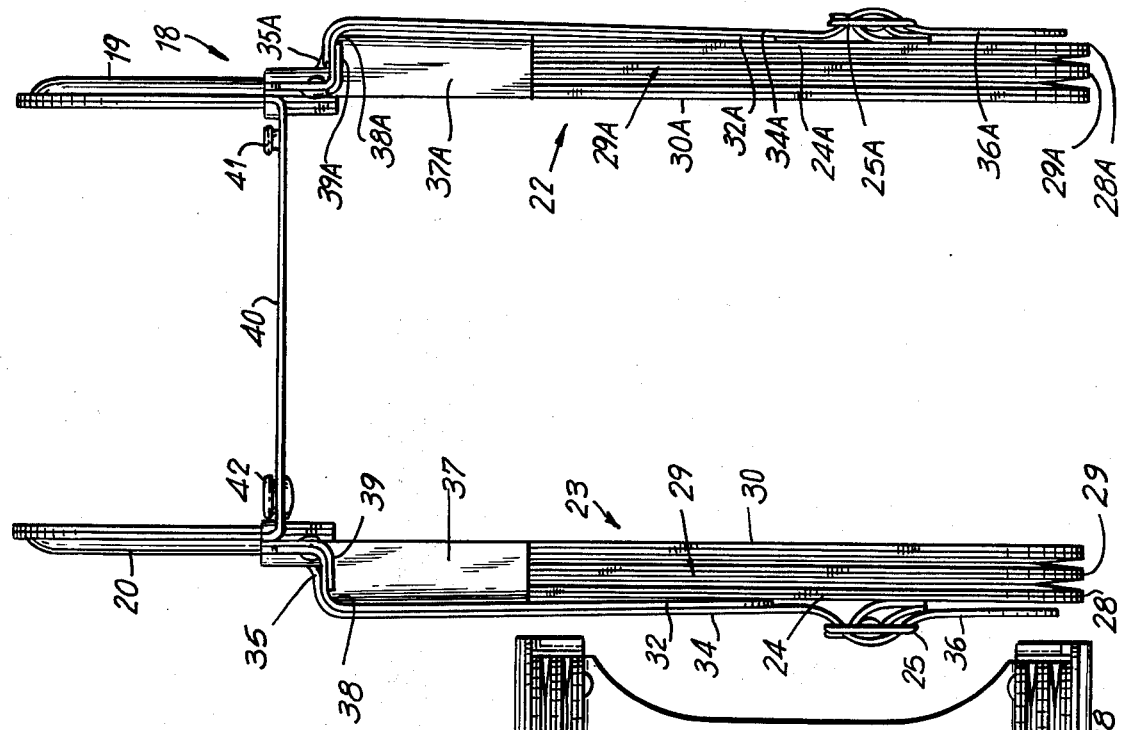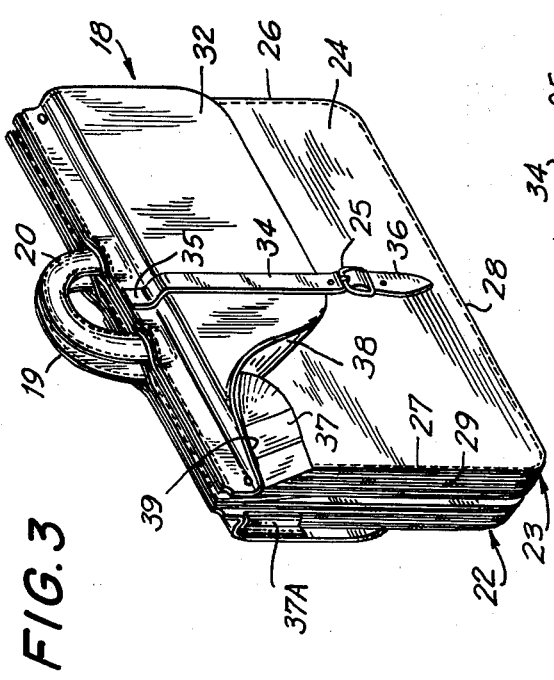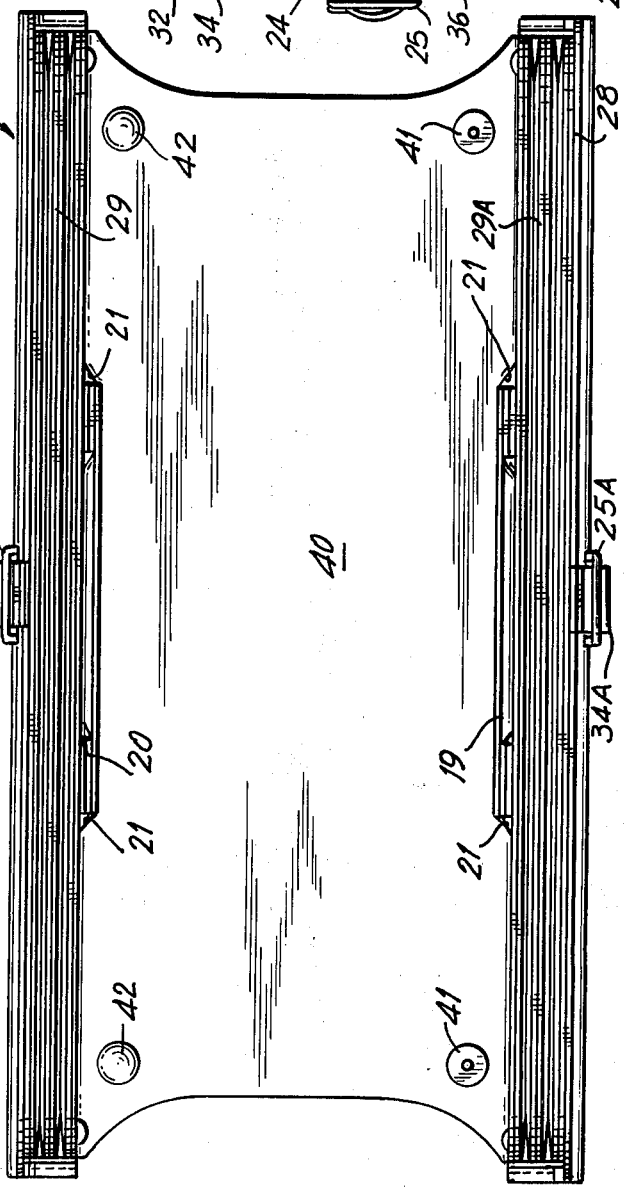

CONVERTIBLE SADDLE BRIEF CASE

This is a continuation-in-part application of my co-pending application Ser. No. 547,655, filed Feb. 6, 1975, entitled CONVERTIBLE SADDLE BRIEFCASE.

This invention relates generally to briefcases, and more particularly to a convertible saddle briefcase for use on and off of a wheeled vehicle, such as a bicycle, or the like.

The remarkable sales successes within the bicycle and bicycle accessory industries has been enjoyed by both suppliers and consumers alike. Never before have both urban and suburban populations taken to these wheeled vehicles to this extent. Bicycle riders, for example, are learning from our neighbors around the world that these non-polluting vehicles provide the user with much needed exercise and rather rapid, efficient transportation to and from business and recreational activities. As might be expected, with increased sales in vehicles, there has been a commensurate increase in sales of all types of accessories for use with these vehicles. Some provide the user with realistic safety aids, while others merely provide yet another means for spending money on the useless and unnecessary.

To the surprise of many in this country, businessmen are learning that the bicycle, for example, provides an opportunity to get places quickly in a way that pays the added dividend of providing a bit of exercise to those usually held captive within an office environment. Traffic jams do not discourage the bicycle rider who is able to bypass the overheated multi-ton vehicles and drivers alike. And yet, a need exists for a briefcase which is particularly adapted to and be easily carried by bicycles, mopeds, motorcycles and similar-type vehicles of various types. Apart from stuffing briefcases and packages beneath the "rat-trap" rear bicycle luggage carrier, riders do not have available to them on the market an article capable of functioning both as a briefcase and as a saddle-type bag capable of being safely and easily supported upon a wheeled vehicle support member.

Of course, saddlebags have been known to us for some time. I believe it will be helpful to the reader to discuss in a bit more detail here some of the saddlebag prior patent art known to me so that the improvements disclosed herein will be more appreciated. As far back as Nov. 30, 1880, U.S. Pat. No. 235,013 was granted to Richard Pettus for a saddlebag blank capable of being formed into the article shown in FIG. 1 of this patent. In 1886, U.S. Pat. No. 340,339 was granted to Marshall for a combination convertible saddlebag and hand trunk. U.S. Pat. No. 271,540 was granted to Strubbe in 1883 for a combined hand and saddle valise.

U.S. Pat. No. 424,324 was granted to Marshall in 1890 for a saddlebag/hand-trunk combination. A similar type of article is disclosed in U.S. Pat. No. 433,083, which was granted to Judy in 1890. Mr. Marshall, once again was granted U.S. Pat. No. 476,545 in 1892 for a combination saddlebag and hand case. U.S. Pat. No. 501,821, granted in 1893 to Browne discloses a saddlebag capable of housing one or more medicines and receptacles, as shown in FIG. 2. A luggage carrier for bicycles was patent in 1898 by a Mr. Beck, under U.S. Pat. No. 606,018. A combined mail and saddlebag was patented in 1904 by Prudhomme under U.S. Pat. No. 761,907.

With the advent of automobiles, luggage carriers of the type disclosed within U.S. Pat. No 1,665,892, granted in 1928, became known. Yet another saddlebag was patented in 1884 by Wood under U.S. Pat. No. 299,609. Of interest in this Wood patent is the configuration of the bicycle disclosed therein. U.S. Pat. No. 2,405,744 to Glass discloses a double luggage bag for cycles, as does the valise/back pack combination disclosed within U.S. Pat. No. 3,786,972, patented in 1974 to Mr. Alley.

My purpose in bringing the aforementioned prior art to the attention of the reader is twofold. Firstly, it is my desire to make known all relevant prior art presently known to me at the time of the filing of this application. It is also my objective to illustrate the failings of the prior art to provide a convertible saddle briefcase of the type I have invented and which will provide the user with the benefits intended and contemplated by the present invention.

It is an object of the present invention to provide a convertible saddle briefcase of the type illustrated and described below.

Another object of the present invention is to provide a briefcase having a pair of housing portions which are separated by a web member which is capable of supporting the entire item upon the support member of a wheeled vehicle, such as a bicycle.

Another object of the present invention is to provide a convertible saddle briefcase which, when used as a briefcase, functions and has the appearance of a conventional saddle briefcase, such that parties viewing this item will not be able to discern the saddlebag capabilities thereof.

Another object of this invention is to provide a combination saddlebag and briefcase structure which is capable of being supported either upon the forward reach or bar of a bicycle, or upon the rear luggage carrier thereof.

The present invention fulfills the aforementioned objects and overcomes limitations and disadvantages of prior art attempts to solve relevant problems by providing a convertible saddle briefcase capable of use as either a saddle-type support bag or a briefcase. A pair of housing receptacles are spaced from one another and joined by a web member which interconnects these housing receptacles at predetermined points thereof. Handles provide means for supporting both of said housing receptacles upon a wheeled vehicle support member such that each housing receptacle may accommodate and hold one or more articles of a selected size and shape. In use as a saddlebag, the web member is capable of supporting these housing receptacles in hanging positions on either side of a vehicle support member. When used as a briefcase, the web member folds from view so that the user is provided with a functional and aesthetically pleasing article having the appearance of a briefcase.

The invention will be more clearly understood from the following description of specific embodiments of the invention, together with the accompanying drawings, wherein similar reference characters denote similar elements throughout the several views, and in which:

FIG. 1 is a perspective view of a bicycle equipped with two embodiments of the convertible saddle briefcase contemplated by the present invention;

FIG. 2 is a sectional elevational view taken along the line 2—2 of FIG. 1;

FIG. 3 is a perspective view of a convertible saddle briefcase according to the present invention, and illustrating same for use as a briefcase;

FIG. 4 is an end elevational view of the briefcase illustrated in FIG. 3;

FIG. 5 is a bottom view of the convertible saddle briefcase shown in FIG. 4;

FIG. 8 is a sectional elevational view taken along the line 8—8 of FIG. 1.

Figure 6:
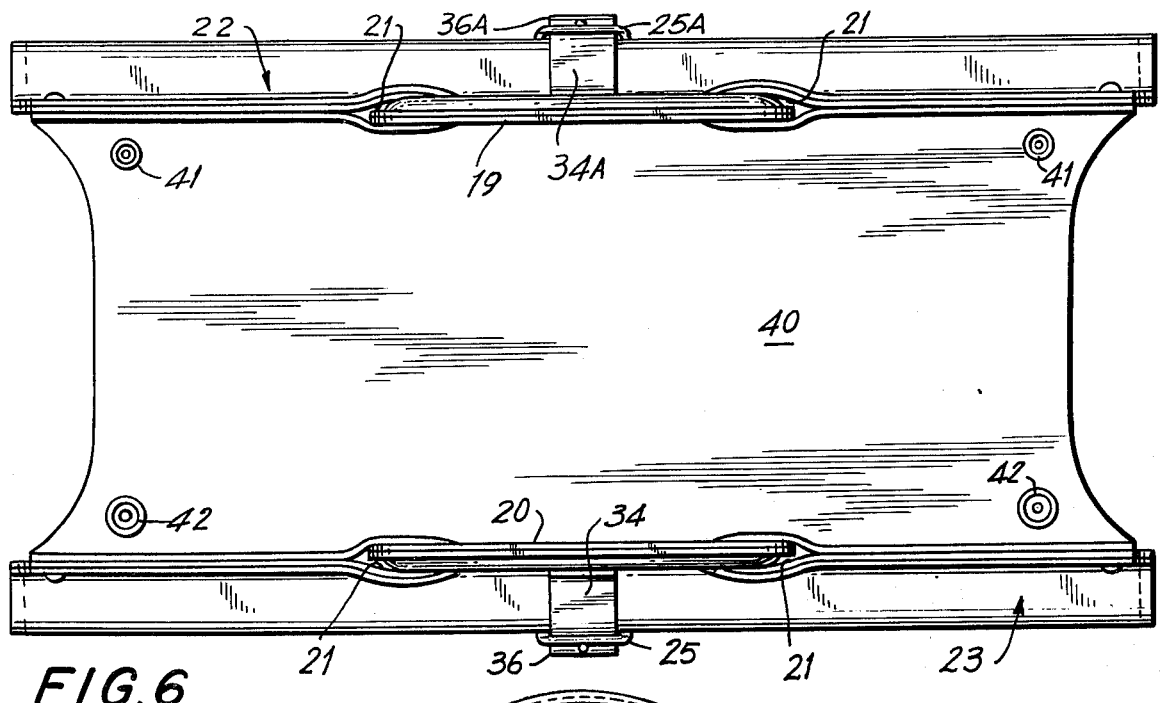
FIG. 6 is a top plan view of the convertible saddle briefcase shown in FIG. 4.
Figure 7:
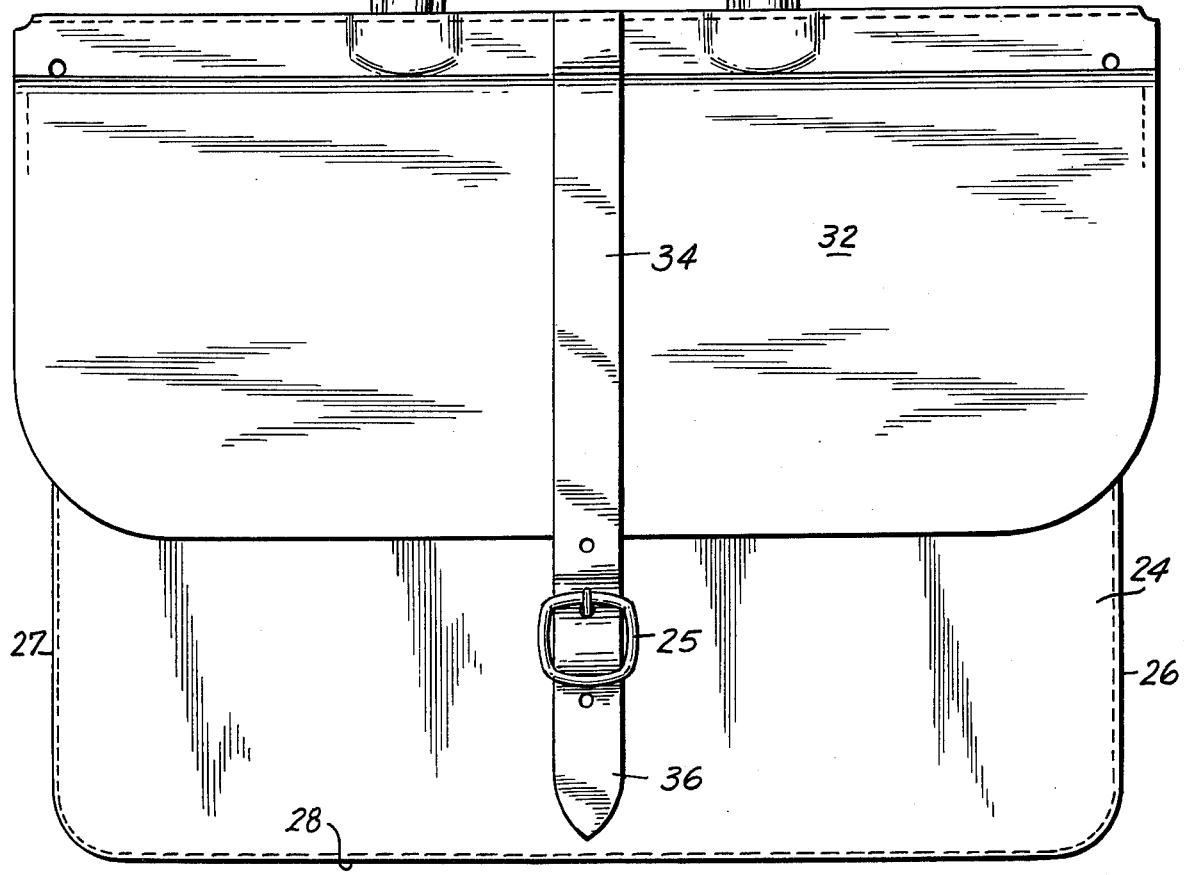
FIG. 7 is a front elevational view of the convertible saddle briefcase shown in FIG. 4.

Referring now in more detail to the drawings, a bicycle 10 is shown in FIG. 1. While no claim is made by me that the present invention includes any portion of bicycle 10, I believe it will be helpful to the reader if a certain number of the component parts of bicycle 10 are labeled so that a better appreciation may be realized insofar as the placement of my invention upon a vehicle, such as bicycle 10, is concerned. More specifically, bicycle 10 is equipped with handlebars 11, a seat 12, a rear carrier 13 located above rear wheel 14 and supported by frame 15 of bicycle 10. Frame 15 includes a forward reach or bar 16 which, in the case of conventional bicycles for males, serves to increase the structural integrity of the bicycle frame.

Two distinct embodiments of a convertible saddle briefcase according to my invention are shown mounted upon bicycle 10 in FIG. 1, namely briefcase 17 which is mounted upon forward reach 16, and briefcase 18 which is mounted upon rear carrier 13. Throughout this specification I well refer to my convertible saddle briefcase as simply a briefcase in some instances, in order not to burden the reader with excess verbiage. A convertible saddle briefcase or briefcase 17 is illustrated in FIG. 1 supported by the forward reach or bar 16 of bicycle 10, while another embodiment of my invention in the form of briefcase 18 is also shown in FIG. 1 supported upon the rear carrier 13 of this same bicycle. One of the reasons for illustrating in one figure of the drawings both embodiments of my briefcase and, for that matter, two different briefcases, is to demonstrate that this invention contemplates the provision of a convertible saddle briefcase which is capable of being supported by two or more portions of a conventional bicycle, for example. It should also be kept in mind, however, that my invention contemplates the supporting of a convertible saddle briefcase upon any number of wheeled vehicles, including bicycles, motorcycles, motorized bicycles, etc.

Let us look for a moment at some of the structural features and details of convertible saddle briefcase 18. FIG. 3 best illustrates, in a perspective-type view, the appearance of this briefcase 18 when in a closed condition in which it assumes the functions and appearance of a briefcase. A pair of handles 19 and 20 are shown in FIG. 3 in a raised, juxtaposed position whereby a hand of the user may easily grip both so as to support or carry briefcase 18. Handles 19 and 20 are supported within openings 21, best seen in FIG. 6 of the drawings. The structural members defining openings 21 will be described in more detail below.

Two separate and distinct compartment cases 22 and 23, respectively, form a part of briefcase 18. Each of compartment cases 22 and 23 comprises a separate and distinct self-contained envelope or housing capable of holding and protecting one or more items of a predetermined size and shape. Compartment case 23 for example, consists of a hunt panel member 24 to which a buckle 25 is secured midway along its length and approximately one quarter of the distance up from the bottom of compartment case 23 to its upper extremities. Buckle 25 may consist of one of any number of suitable fasteners and, for that matter, it is contemplated that this invention includes the use of the hook-and-loop material marketed under the trademark Velcro. Front panel member 24 is secured at its sides 26 and 27, as well as its bottom edges 28, to an accordion-pleated web member 29. Web member 29 is fastened to front panel member 24 by stitching, heat sealing, adhesive bonding, or other conventional fastening means.

A rear panel member 30 is cooperatively secured to accordion web member 29 in much the same manner as has been described for front panel member 24. The presence of front panel member 24, rear panel member 30 and accordion-pleated web member 29 about the sides and bottoms thereof, forms an expandable pocket 31 therewithin (not specifically shown in the drawings).

The contents, if any, and the inner portions of expandable pocket 31, are protected by means of an overlying front flap 32 which extends the entire width of briefcase 18. Flap 32 is secured at its topmost extremities to rear panel member 30 and extends downwardly over the uppermost edges 33 of front panel member 24. In order to assure the maintenance of front flap 32 in a downwardly extending, protective position in which it covers portions of front panel member 24, a strap 34 is provided. In its closed or fastened position shown in FIGS. 3 and 4, for example, strap 34 extends downwardly from its uppermost end 35 to its perforated end 36. As seen in FIGS. 3 and 4, end 36 cooperatively and releasably engages buckle 25 such that the strap 34 may be fastened and unfastened at the will of the user of briefcase 18. A number of openings in end 36 provides for adjustments for predetermined tension within strap 34, and also to provide for expansion of compartment case 23.

In a preferred embodiment of my invention, a side gusset 37 is provided at each side of compartment case 23. Gusset 37 is accordion-pleated and is secured at its upper extremities to the inner surfaces 38 of front flap 32. The seam or interface 39 between gusset 37 and inner surfaces 38 is substantially watertight, so as to provide protection against the entry of a driving rain or moisture directly into expandable pocket 31. This invention contemplates the sealing of all but the bottom edges of gusset 37 to and against front flap 32 and either rear panel member 30 or accordion-pleated web member 29. In this way, yet further protection against the elements is realized.

The number of accordion web members corresponding to web member 29 may be varied to provide a predetermined and selected amount of expansion. Thus, a single accordion pleat, utilizing a single accordion web member 29, will provide a limited amount of expansion and will limit the amount of lateral bulge in directions transverse with respect to the general longitudinal direction or plane of briefcase 18. On the other hand, the use of a plurality of web members 29 will facilitate carrying greater amounts of cargo or materials within compartment case 23.

In a preferred embodiment of the present invention, compartment case 22 consists of the same or identical components described above for compartment case 23.

In the interests of limiting the size of this specification and in order to provide the reader with a better understanding of this invention, the following elements which make up compartment case 22 are listed adjacent their respective reference characters, namely: front panel member 24A corresponds to front panel member 24; buckle 25A corresponds to buckle 25; side 26A corresponds to side 26; side 27A corresponds to side 27; bottom edges 28A correspond to bottom edges 28; accordion web member 29A corresponds to accordion web member 29; rear panel member 30A corresponds to rear panel member 30; expandable pocket 31A corresponds to expandable pocket 31; front flap 32A corresponds the front flap 32; uppermost edges 33A of front panel member 24A correspond to uppermost edges 33 of front panel member 24; strap 34A corresponds to strap 34; uppermost end 35A corresponds to uppermost end 35; end 36A corresponds to end 36; gusset 37A corresponds to gusset 37; inner surfaces 38A correspond to inner surfaces 38; and seam 39A corresponds to seam 39.

It should be understood that in the manufacture or fabrication of briefcase 18, two identical compartment cases corresponding to compartment cases 22 and 23 may be fabricated in like manner such that either of these compartment cases may comprise compartment case 22 or compartment case 23, as described above.

A saddle web member 40 extends between and is cooperatively interconnected with compartment cases 22 and 23. Saddle web member 40 may be sewn or riveted to rear panel members 30 and 30A, respectively. Openings 21 are provided between saddle web member 40 and rear panel members 30 and 30A to accommodate the presence of handles 19 and 20. Openings 21 are large enough to facilitate the raising and lowering, where desired, of handles 19 aand 20. A pair of male snap fasteners 41 and a pair of female snap fasteners 42 are secured, such as by riveting, to saddle web member 40, as best seen in FIGS. 4, 5 and 6. Male snap fasteners 41 are adapted to matingly engage with female snap fasteners 42 such that, when snapped together, briefcase 18 will assume the configuration of a briefcase 18 best seen in FIG. 3. Similarly, a pulling apart of handles 19 and 20 will result in the unfastening of snap fasteners 41 and 42, to provide the outstretched saddle web member 40, as shown in FIGS. 4, 5 and 6.

FIG. 2 illustrates the positioning of convertible saddle briefcase 18 supported by the rear carrier 13 of a bicycle, such as bicycle 10. The reader will note that handles 19 and 20 have been pulled apart so as to unfasten male and female snap fasteners 41 and 42 from one another, and the entire briefcase 18 is placed upon carrier 13 such that saddle web member 40 supports the weight of same upon carrer 13. Compartment cases 22 an 23 are free to lie next to or adjacent depending carrier frame rods 43 and 44 and may, for that matter, be fastened thereto by conventional fastening means. The plurality of carrier struts 45 which comprise rear carrier 13 evenly distribute the weight of briefcase 18, as transmitted through web member 40. FIGS. 1 and 2 illustrate an advantage of maintaining handles 19 and 20 of briefcase 18 in a raised position, in that a newspaper 46 shown in full line in FIG. 1 and in phantom lines in FIG. 2 may be retained within handles 19 and 20. While not specifically shown, the conventional type of spring-loaded rear carrier commonly known as the "rat-trap" carrier may be utilized to support convertible saddle briefcase 18 such that the spring-loaded member may come to bear upon the upper surfaces of saddle web member 40. In such cases, yet additional captivity is afforded the user.

In FIG. 8, an alternate embodiment of the present invention is illustrated in the form of convertible saddle briefcase 17. Briefcase 17 is much like briefcase 18, but for a number of modifications. For one thing, a saddle web member 47 interconnects compartment cases 22 and 23 at points well below points of attachment illustrated and already described for web member 40 of convertible saddle briefcase 18. By providing this latter type of structure, it can be seen in FIG. 8 that briefcase 17 may be carried or supported upon forward reach or bar 16 of bicycle 10 in a manner which will limit the upward projection of briefcase 17 above bar 16. by dropping the points of attachment of saddle web member 47 to rear panel members 30 and 30A, convertible saddle briefcase 17 may be mounted upon forward reach or bar 16 without the bottommost portions of the briefcase interfering with the feet or legs of the user when he or she is propelling bicycle 10. It should be obvious that the use of saddle briefcase 18 upon the forward reach or bar 16 of bicycle 10 will result in the disposition or hanging of briefcase 18 at positions lower than that illustrated for briefcase 17 in FIG. 1. As an added measure of security to prevent the dislocation of saddle briefcase 17 from the forward reach of bar 16, at least one pair of cooperative, matingly engaging snap fasteners 48 are provided, as shown in FIG. 8. Thus, convertible saddle briefcase 17 may easily be used either upon the forward reach or bar 16 of bicycle 10 or, for that matter, upon rear carrier 13 of this same bicycle.

In use, the user of my invention is provided with a convertible saddle brief case which exists in the form of either convertible saddle briefcase 17 or 18. Two briefcase units or compartment cases 22 and 23 are joined by a saddle web member 40 or 47 in a manner which permits the entire unit to be set upon and supported by the rear luggage carrier 13 or the forward reach or bar 16 of a wheeled vehicle, such as bicycle 10.

Each compartment case 22 and 23 is approximately 11 inches by 17 inches in overall dimensions and each is provided with an accordion-type folding edge construction, facilitated by accordion web members 29 and 29A. This accordion-type folding construction allows each compartment case to expand so as to accommodate papers or other objects. A pair of handles 19 and 20 permit the user to hand-carry the convertible saddle briefcase as he or she would carry an ordinary briefcase.

The convertible saddle briefcase according to this invention is constructed in a manner which permits it to assume a folded condition, when not in use upon a wheeled vehicle. Pairs of grommet-type male and female snap fasteners hold compartment cases 22 and 23 and the intermediate web 40 or 47 together such that the entire unit looks and functions like a conventional briefcase when it is hand-carried Upon pulling of handles 19 and 20 apart, the male and female snap fasteners are opened such that web 40 or 47 assumes a flat configuration, thereby permitting same to be placed upon the bicycle luggage rack whereat it can be held in place either by the "rat-trap" spring-loaded clip customarily built into such carriers, or by one or more elastic bands or shock cords usually sold for such purposes.

The upper edges of the briefcase front flaps 32 and 32A cooperate with gussets 37 and 37A so as to overlap the accordion web members 29 and 29A of compartment cases 22 and 23. This prevents the entry of rain or snow when the unit is used in inclement weather. Handles 19 and 20 are of the retractable type.

Convertible saddle briefcases 17 and 18 may be constructed of any number of materials, such as leather, vinyl, vinyl or other plastic-coated fabric, canvas, or combinations of same. This invention also contemplates the use of a shoulder strap in addition to handles 19 and 20, to provide the user with yet another means of supporting same either upon his or her shoulder and/or upon bicycle 10.

The embodiments of the invention particularly disclosed and described are presented merely as examples of this invention. Other embodiments, forms and modifications of my invention coming within the proper scope and spirit of the appended claims will, of course, readily suggest themselves to those skilled in the art.

What is claimed is:

1. A convertible receptacle for use with wheeled vehicles having a support member, comprising, in combination: a first housing portion operationally defining a first receiving compartment therewithin; a second housing portion operationally defining a second receiving compartment therewithin; a web portion integral with and interconnecting said first and second housing portions; a first handle portion associated with and secured to said first housing portion; a second handle portion associated with and secured to said second housing portion; and snap means integral with said housing portions for removably holding said first and second housing portions in a proximate relationship with respect to one another; said first housing portion including front and rear walls interconnected by opposing side and bottom walls, said side and bottom walls being formed with a plurality of folded portions thereof to permit expansion of said front and rear walls away from one another, a flap member integral with said rear wall extending in overlapping relationship with respect to said front wall, thereby covering uppermost extremities of said front and side walls and an access opening defined thereby, a fastener member integral with said front wall and accessible to a user of the convertible receptacle, a fastener portion of said flap member extending to said fastener member, said fastener portion including fastening means cooperative with respect to said fastener member for enabling the user to secure said fastener member and said fastening means together, and a pair of guard means integral with and depending from opposite inside border surfaces of said flap member, said guard means comprising material capable of folding upon itself and expanding to cover paths of undesirable elements of the weather to inner portions of said first receiving compartment, said guard means covering upper extremities of said side walls, said second housing portion including front and rear walls interconnected by opposing side and bottom walls, said side and bottom walls being formed with a plurality of folded portions thereof to permit expansion of said front and rear walls away from one another, a flap member integral with said rear wall and extending in overlapping relationship with respect to said front wall, thereby covering uppermost extremities of said front and side walls and an access opening defined thereby, a fastener member integral with said front wall and accessible to a user of the convertible receptacle, a fastener portion of said flap member extending from said rear wall over said flap member to said fastener member, said fastener portion including a fastening means cooperative with respect to said fastener member for enabling the user to secure said fastener member and said fastening means together, and a pair of guard means integral with and depending from opposite inside border surfaces of said flap member, said guard means comprising material capable of folding upon itself and expanding to cover paths of undesirable elements of the weather to inner portions of said first receiving compartment, said guard means covering upper extremities of said side walls, said web portion being formed with handle openings therethrough adjacent said first and second housing portion rear walls, said first and second handle portions extending through said handle openings and being capable of movement between usable and retracted positions, said first and second handle means being shaped to permit their being comfortably and simultaneously grasped by one hand of the user, said web member being capable of supporting said housing portions from a wheeled vehicle support member and being further capable of folding from view to provide the user with an article having the appearance and characteristics of a briefcase.

* * * * *